United States Patent
Barnes (10) Patent No.: US 10,274,108 B2
(45) Date of Patent: Apr. 30, 2019

(54) METHOD OF LAYING LINED PIPELINE

(71) Applicant: Pioneer Lining Technology Limited, Clydebank (GB)

(72) Inventor: Stephen Barnes, Glasgow (GB)

(73) Assignee: Pioneer Lining Technology Limited, Clydebank (GB)

( * ) Notice: Subject to any disclaimer, the term of this patent is extended or adjusted under 35 U.S.C. 154(b) by 0 days.

(21) Appl. No.: 15/559,403

(22) PCT Filed: Feb. 29, 2016

(86) PCT No.: PCT/GB2016/050522
§ 371 (c)(1),
(2) Date: Sep. 18, 2017

(87) PCT Pub. No.: WO2016/151279
PCT Pub. Date: Sep. 29, 2016

(65) Prior Publication Data
US 2018/0073666 A1 Mar. 15, 2018

(30) Foreign Application Priority Data
Mar. 20, 2015 (GB) .................... 1504746.7

(51) Int. Cl.
| F16L 1/16 | (2006.01) |
| F16L 58/10 | (2006.01) |
| F16L 55/165 | (2006.01) |
| B63B 35/03 | (2006.01) |
| F16L 1/18 | (2006.01) |
| F16L 1/19 | (2006.01) |
| F16L 1/26 | (2006.01) |
| F16L 58/18 | (2006.01) |

(52) U.S. Cl.
CPC .............. *F16L 1/163* (2013.01); *B63B 35/03* (2013.01); *F16L 1/18* (2013.01); *F16L 1/19* (2013.01); *F16L 1/26* (2013.01); *F16L 55/1652* (2013.01); *F16L 58/1009* (2013.01); *F16L 58/1036* (2013.01); *F16L 58/181* (2013.01)

(58) Field of Classification Search
CPC combination set(s) only.
See application file for complete search history.

(56) References Cited

U.S. PATENT DOCUMENTS 3,756,034 A 9/1973 Lochridge et al.
5,685,572 A * 11/1997 Linton .................. B29C 65/342
219/535

(Continued)

FOREIGN PATENT DOCUMENTS

| CH | 604 061 | 8/1978 |
| WO | WO 02/084160 | 10/2002 |
| WO | WO 2010/041016 | 4/2010 |

*Primary Examiner* — Kyle Armstrong
(74) *Attorney, Agent, or Firm* — Levy & Grandinetti (57) ABSTRACT

A method lays lined pipeline which actively and successfully removes air pockets which might be trapped in the annulus between the liner and the host pipe by progressively flooding the lined pipeline. Further, the liner is brought into closer contact and engagement with the host pipe. The removal of air in the annulus enables the pipeline test pressure to stabilize more quickly and avoids the risk of potential collapse during operational service life in the event the pipeline pressures fluctuate or a vacuum is created during an emergency shutdown.

18 Claims, 6 Drawing Sheets

(56) References Cited

U.S. PATENT DOCUMENTS

| | | | | |
|---|---|---|---|---|
| 5,905,675 | A * | 5/1999 | Madurawe | G11C 16/0441 |
| | | | | 257/319 |
| 6,910,848 | B1 * | 6/2005 | Baugh | F16L 1/19 |
| | | | | 414/745.7 |
| 8,398,119 | B2 * | 3/2013 | Kenworthy | B29C 65/344 |
| | | | | 219/535 |
| 8,876,433 | B2 * | 11/2014 | Mair | F16L 1/161 |
| | | | | 405/168.3 |
| 2005/0123355 | A1 | 6/2005 | Kolenski et al. | |
| 2006/0210361 | A1 * | 9/2006 | Lamison | F16L 1/161 |
| | | | | 405/168.3 |
| 2007/0284872 | A1 | 12/2007 | Pionetti | |
| 2013/0195557 | A1 * | 8/2013 | Bertaso | B21C 37/154 |
| | | | | 405/168.3 |

* cited by examiner

METHOD OF LAYING LINED PIPELINE

The present invention relates to methods of laying pipe on the seabed. More specifically, the present invention concerns improvements to methods of laying lined pipeline that increases the integrity and reliability of the process and of the resulting lined pipeline in service.

BACKGROUND TO THE INVENTION

The life and performance of new and existing pipelines can be extended and optimised by lining lengths of metal pipe with polymer liners. Prior to their insertion in a host pipe, polymer liner pipes have a larger outer diameter than the inner diameter of the host pipe into which they are being inserted. The liner pipes are temporarily reduced in diameter immediately prior to insertion, for example by pulling them through the host pipe via a reduction die. After the insertion of the liner pipe is completed, the pulling tension is released and the liner pipe is allowed to revert towards its original size so as to provide a tight fitting liner inside the host pipe.

However, during the reversion process, the varying geometry of the inner diameter of the host pipe and the influence of any internal weld bead protrusions, surface irregularities and the like, may interfere with the reversion process, causing it to be uneven. In these circumstances, it is possible that air pockets may be trapped in the annular space between the outer surface of the liner pipe and the inner surface of the host pipe.

This is considered to present a potential operational risk that the liner pipe may collapse during operation of, say, a flowline which comprises lined pipeline. It is also considered to present a potential operational risk during initial laying of the lined pipeline—to the extent that it may not be considered safe to lay lined pipeline on the seabed using conventional methods.

Accordingly, it is an object of at least one aspect of the present invention to provide a method of laying lined pipeline that at least reduces the operational risks associated with laying lined pipeline on the seabed. Embodiments of aspects of the present invention are intended to increase the safety, integrity and reliability of the process and also of the resulting lined pipeline, and to obviate or mitigate one or more further disadvantages of existing methods.

Further aims and objects of aspects and embodiments of the invention will become apparent from reading the following description.

SUMMARY OF THE INVENTION

According to a first aspect of the invention, there is provided a method of laying lined pipeline on a seabed, the method comprising providing a lined pipeline having a continuous annulus between a liner of the lined pipeline and a host pipe, lowering the lined pipeline towards the seabed while keeping a lower end of the pipeline closed, and subsequently opening the lower end of the pipeline to allow seawater to progressively flood the lined pipeline.

Progressively flooding the lined pipeline in this manner causes a corresponding progressive application of increasing water pressure along the length of the pipeline from the seabed to the surface which acts to displace any air pockets in the annulus in the direction of the surface. Providing a lined pipeline with a continuous annulus ensures that there is no build up of air at any point along the pipeline during laying.

Preferably, the lined pipeline is lowered to the seabed before opening the lower end of the pipeline, however the lower end of the pipeline may be opened whenever a suitable pressure differential is obtained.

Most preferably, the method comprises continuing to lay the pipeline while the lower end of the pipeline is open. Venting of the annulus—along the annulus—may therefore occur during the entire pipe laying operation.

The lined pipeline may be laid using a pipe lay vessel such as a reel lay vessel, in which case the lined pipeline may be disposed on and deployed from a reel. Alternatively the pipeline may be constructed length-by-length on a pipe lay vessel such as an s-lay or j-lay barge. Lined pipeline may also be towed into position. Optionally, the flooding of the lined pipeline is controlled from the pipe lay vessel.

The lined pipeline may comprise a plurality of lined pipe sections having respective linings that are joined to provide a continuous annulus between the linings and the pipes. In this respect, providing a lined pipeline may comprise joining sections of lined pipe, and joining respective linings of the lined pipe sections to preservce the continuity of an annulus along the length of the joined pipe sections.

In any case, it is preferred that sections of lined pipe which make up the lined pipeline are joined using an electrofusion fitting. Where applicable, the method preferably further comprises joining sections of lined pipe using electrofusion fittings. Alternatively, the sections of lined pipe may be joined using butt fusion welds. The method may alternatively comprise joining sections of lined pipe using any joining process which preserves continuity of the annulus.

The electrofusion fitting or fittings preferably comprise an inner diameter commensurate with an inner diameter of the liner. Most preferably, the electrofusion fitting or fittings comprise an outer diameter commensurate with an outer diameter of the liner.

Accordingly, continuity of the annulus can be maintained by maintaining continuity of the liner, and in particular the outer diameter of the liner, across joins between successive sections of liner.

Optionally, the method further comprises testing the integrity of interfaces or welds between the electrofusion fitting or fittings and respective liners joined thereby. The test may be a pressure test or a leak test. Testing the integrity of the interfaces or welds prior to laying the corresponding section of pipeline ensures that any air trapped in the annulus will not escape into the bore of the pipeline. Means for testing the integrity of the interfaces or welds may be provided within the electrofusion fitting.

Optionally, the method further comprises filling the lined pipeline with seawater at atmospheric pressure before lowering the lined pipeline towards the seabed.

BRIEF DESCRIPTION OF THE DRAWINGS

Aspects and advantages of the present invention will become apparent upon reading the following detailed description and upon reference to the following drawings (like reference numerals referring to like features) in which.

DETAILED DESCRIPTION OF PREFERRED EMBODIMENTS

As discussed in the background to the invention above, there are potential risks associated with the laying of lined pipeline on the seabed. An embodiment of the present invention is illustrated in FIGS. 1 to 6 which reduces these risks and increases the integrity and reliability of the process and of the resulting lined pipeline in service.

As explained in the background to the invention, the life and performance of new and existing pipelines can be extended and optimised by lining lengths of metal pipe with polymer liners. Techniques such as the Applicant's Swagelining® pipe lining service allows existing pipelines to be remediated and new pipelines to be provided with corrosion resistance by installing a polymer liner that remains in tight contact with the inside of a host pipe.

Figure 1:
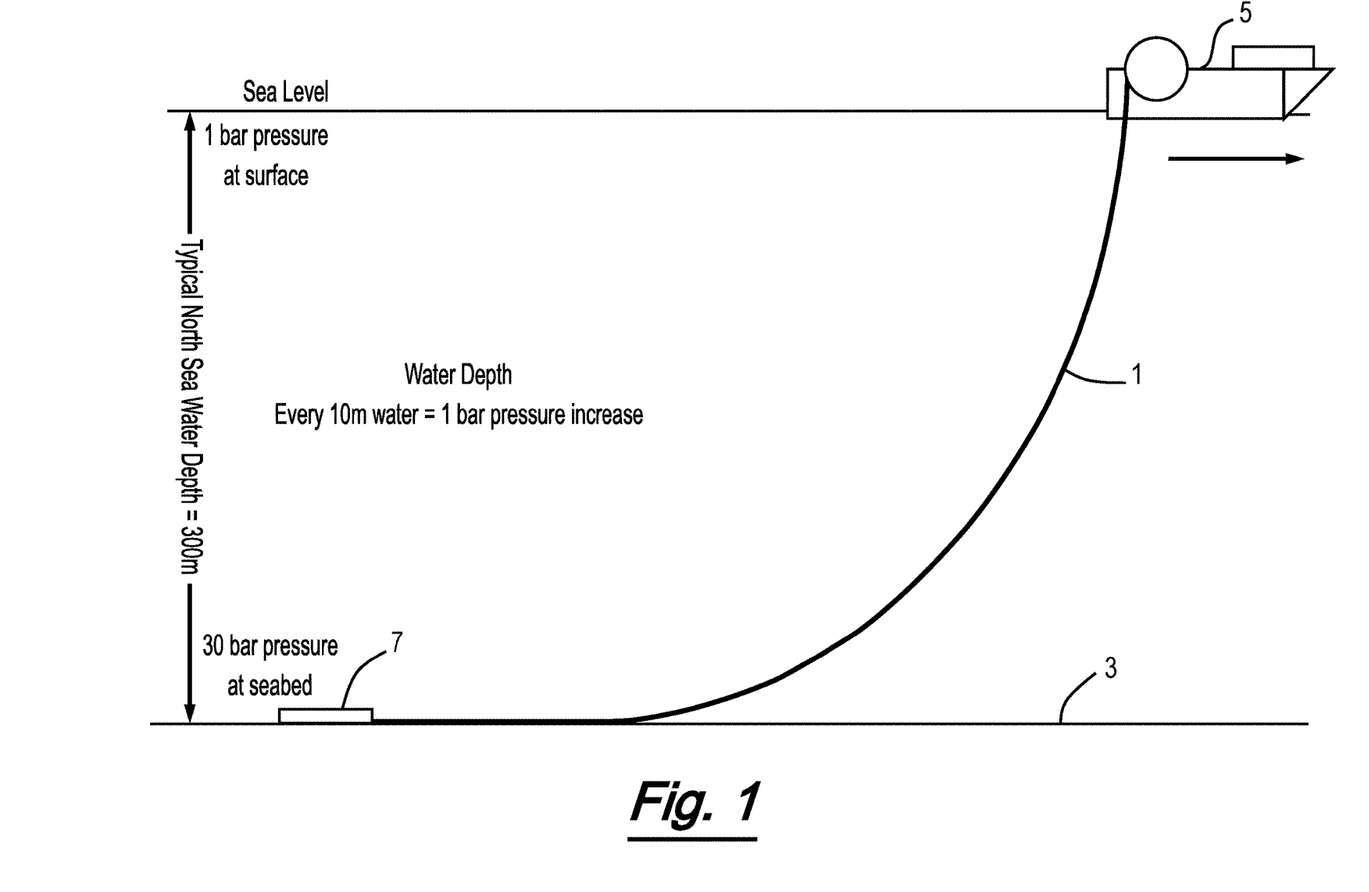
FIG. 1 illustrates a polymer lined pipeline being laid on the seabed by a reelship, in which the lower end of the pipeline is closed in accordance with an embodiment of the invention.

FIG. 1 illustrates a pipelay operation about to commence, in which a polymer lined pipeline 1 is to be laid on the seabed 3 by a reel lay vessel 5 at a typical North Sea water depth of 300 m. The end of the pipeline 1 is attached to a pipeline end termination facility 7 which secures the pipeline 1 to the seabed, for example at or near a subsea manifold. The pipeline end is initially sealed or otherwise closed to prevent the ingress of water. To this end a sealing plate and/or valve, or equivalent arrangement, may be secured to the end of the pipeline.

Note that in this example the water pressure at sea level (i.e. the surface) is 1 bar and the water pressure (which increases by 1 bar every 10 m of depth) at the seabed is 30 bar, which represents a significant pressure differential. Pipelines may of course be laid at significantly greater depths and, accordingly, experience significantly higher pressure differentials.

Figure 2:
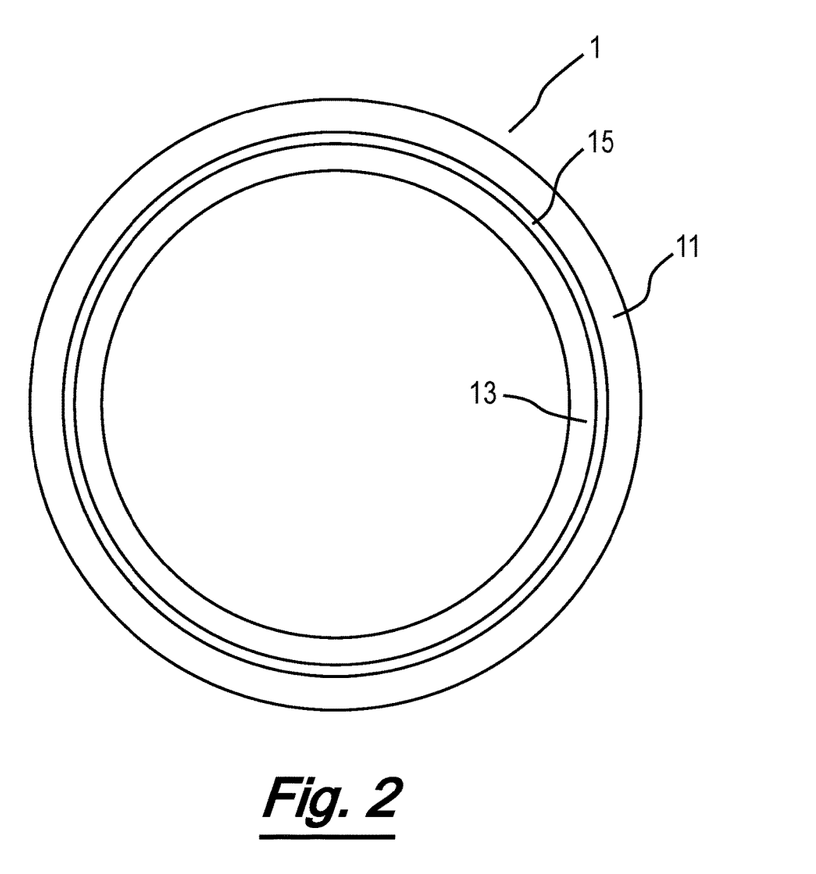
FIG. 2 is a lateral cross-sectional view of the polymer lined pipeline shown in FIG. 1.

FIG. 2 is a schematic lateral cross-section through the pipeline 1 which illustrates the presence of an annulus 15 between the host pipe 11 and the liner 13 of the pipeline 1. In reality, the annulus 15 is microscopic, but is exaggerated here for the purposes of illustration. During the process by which the liner 13 is installed in the host pipe 11 small quantities of air may become trapped in the annulus.

Figure 3:
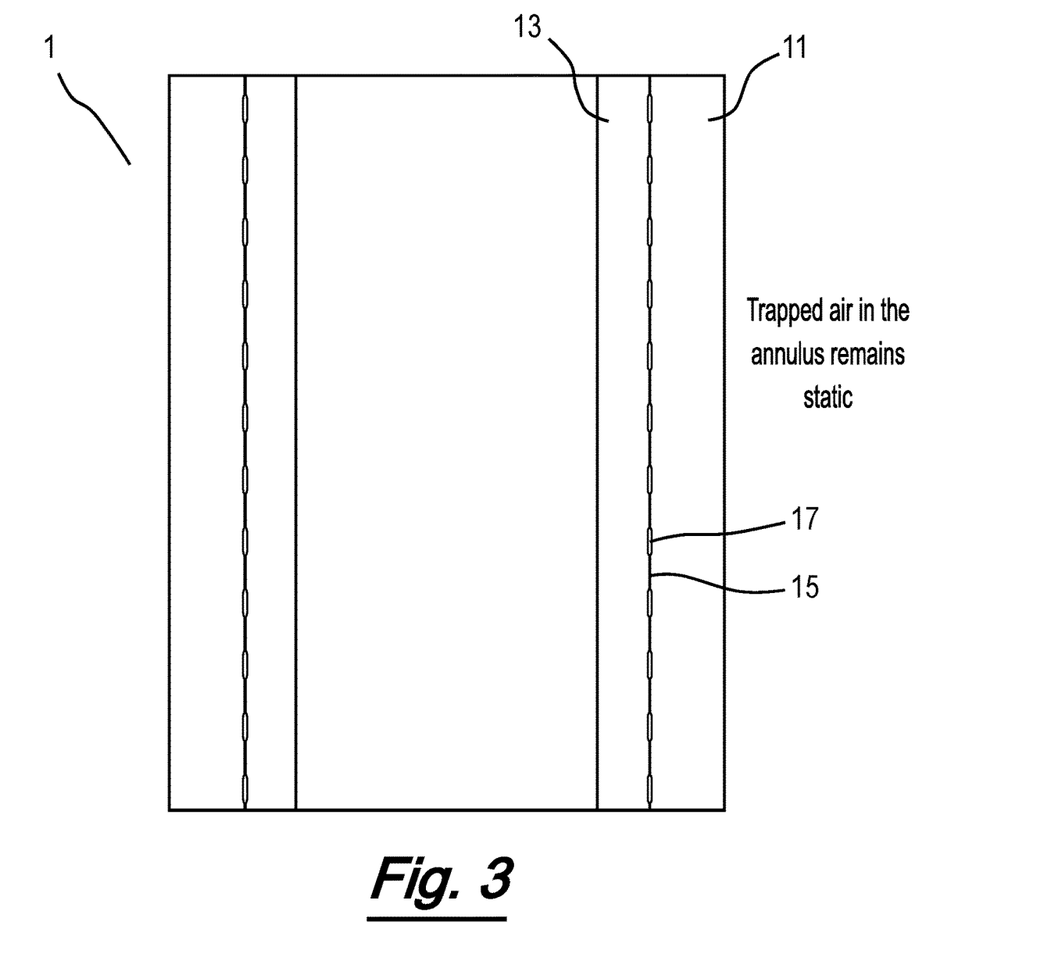
FIG. 3 is a longitudinal cross-sectional view of the polymer lined pipeline shown in FIG. 1.

This is illustrated, again in exaggerated form, in a schematic longitudinal cross-section through a portion of lined pipeline 1 shown in FIG. 3. Within the annulus 15 between the host pipe 11 and liner 13 of the pipeline 1 are pockets of air 17 which have been trapped. This may be the result of surface irregularities or similar interfering with the reversion process when the liner 13 was inserted into the host pipe 11. These pockets of trapped air are considered to present a potential risk of liner collapse during operation of the pipeline 1, for example as a flowline.

Figure 4:
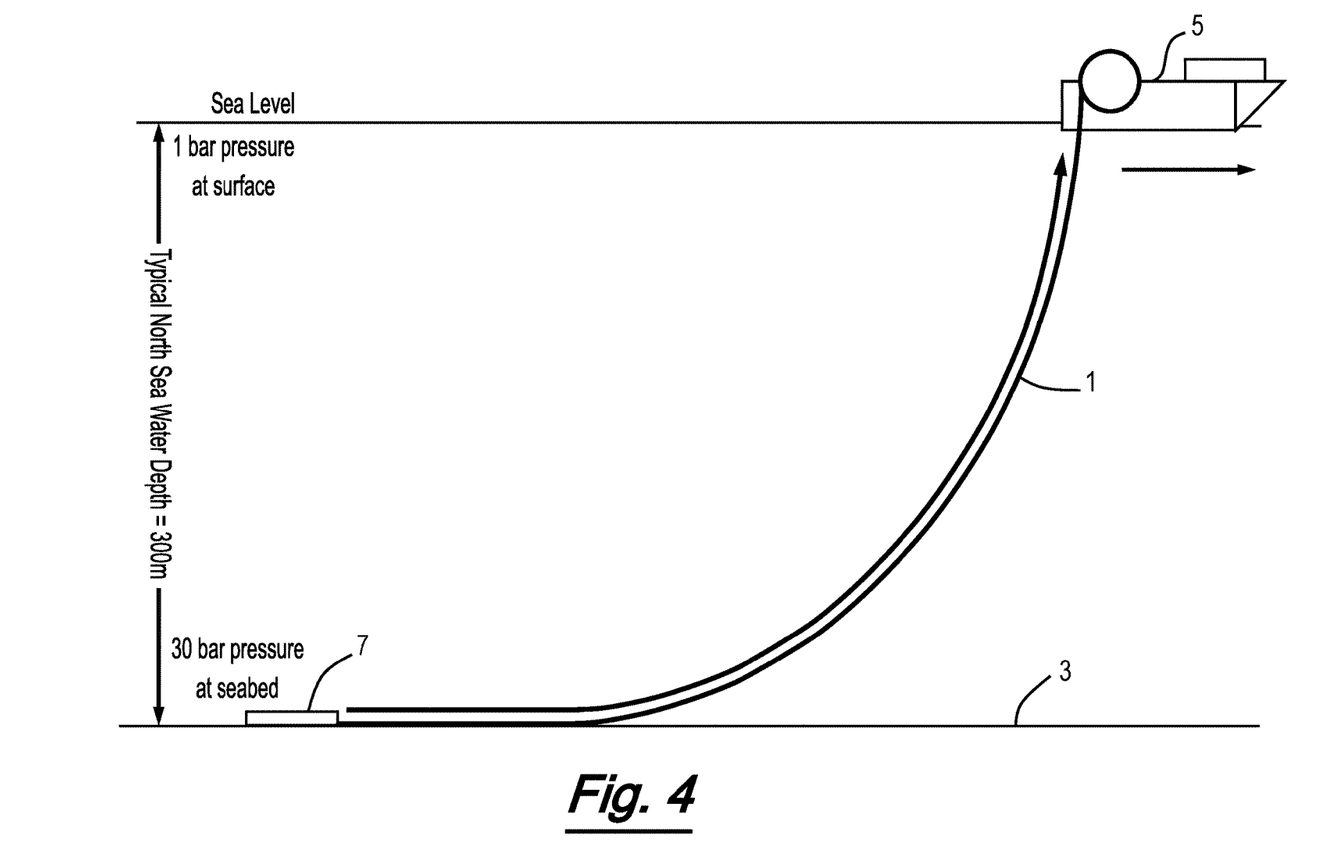
FIG. 4 illustrates the polymer lined pipeline being laid on the seabed by a reelship as, shown in FIG. 1, in which the pipeline is being flooded in accordance with an embodiment of the invention.

As shown in FIG. 4, prior to commencing pipelay, the end of the pipeline 1 is opened in a controlled flooding operation which causes water to enter the pipeline 1 from the seabed 3 under pressure. The seawater rises to sea level inside the pipeline 1. Accordingly, the water pressure within the pipeline 1 exhibits a corresponding pressure differential from, in this example, 30 bar at the seabed 3 to 1 bar at sea level.

Flooding may be controlled using a valve, a variable aperture, a simple open-close gate, or similar located at the end of the pipeline. It is advantageous if the rate of flow of seawater into the pipeline can also be controlled, but equally the seawater may simply be allowed to rush into the pipeline. Flooding may be controlled at the pipeline end termination facility or on the pipe lay vessel itself, or for example by a ROV.

Figure 5:
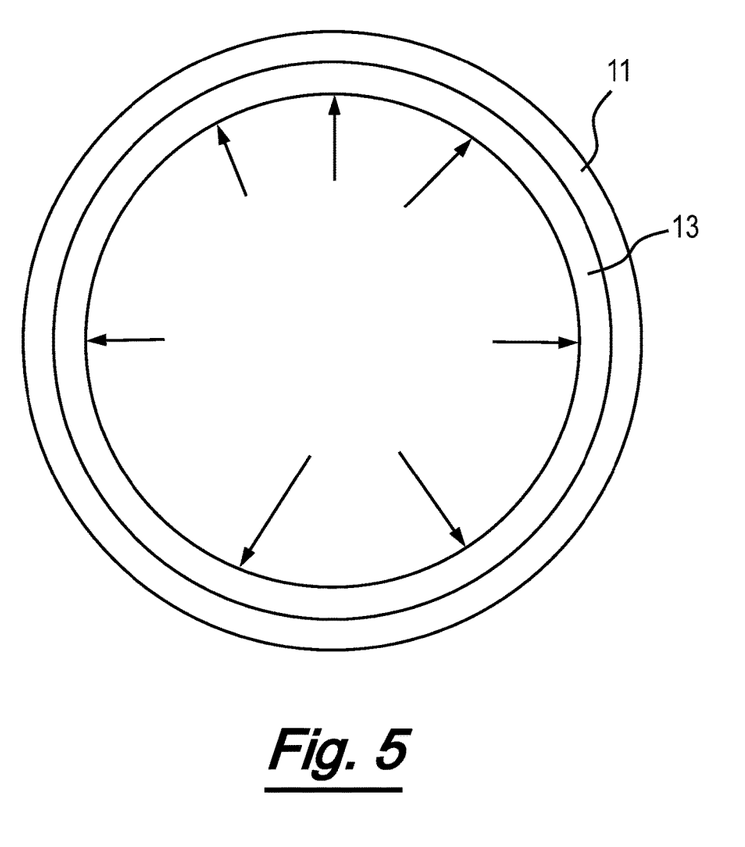
FIG. 5 is a lateral cross-sectional view of the polymer lined pipeline during flooding as shown in FIG. 4.

In any case, the pressure of the seawater entering the pipeline 1 during the controlled flooding actively forces the liner 13 outwards (as illustrated in FIG. 5) until it is compressed against the host pipe 11. The force of the radial expansion far outweighs the reversion force which occurs during the lining process, and by bringing the liner 13 into closer contact with the host pipe 11 any air pockets are displaced.

Figure 6:
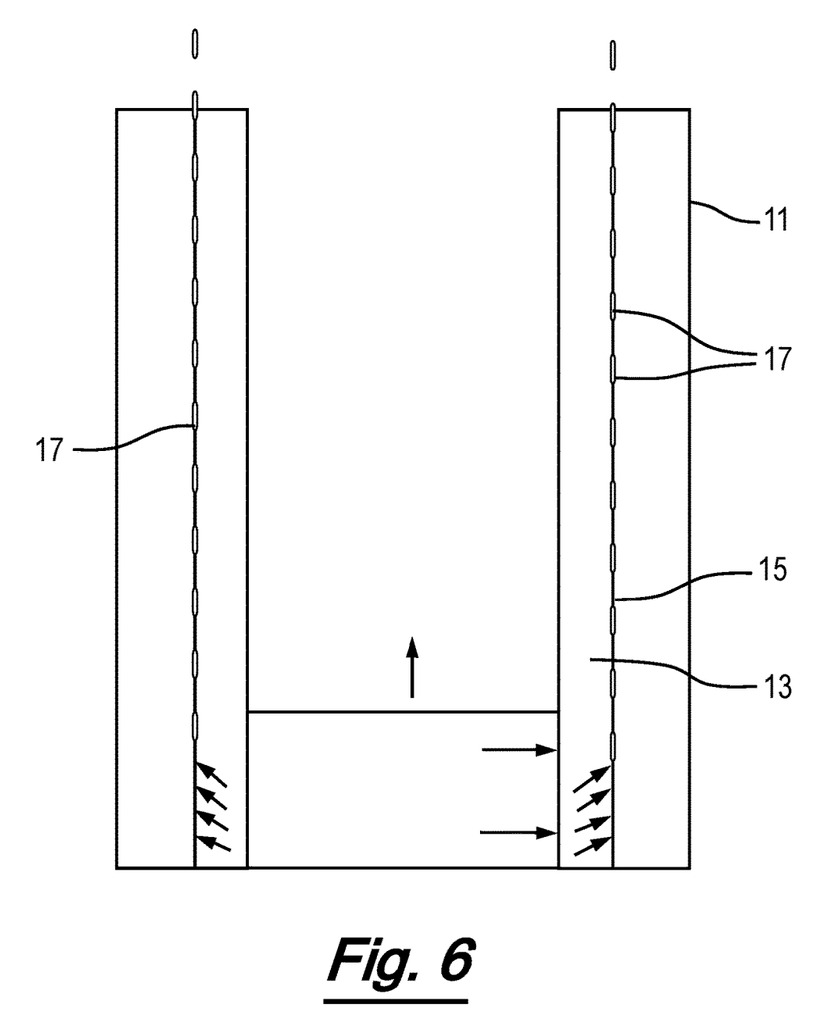
FIG. 6 is a longitudinal cross-sectional view of the polymer lined pipeline during flooding as shown in FIG. 4.

The skilled person will now realise that the pressure differential between the end of the pipeline 1 on the seabed 3 and sea level will result in a corresponding distribution of outwards force which causes the air pockets 17 to be forced along the annulus away from the pipeline end termination 7 in the direction of the pipelay vessel 5, as illustrated in FIG. 6.

According to the invention, the annulus 15 is continuous along the entire length of the pipeline 1 by virtue of the method of fabrication of the pipeline 1. As a result, any air pockets 17 can actually be forced along the entire length of the pipeline 1 leaving little or no trapped air in the annulus at all. Furthermore, as pipelay commences and more pipe settles on the seabed, it will be appreciated that there will be a resultant progressive radial expansion of the liner 13 against the host pipe 11 along the axis of the pipeline 1 such that trapped air 17 is continually driven along the annulus 15 in the direction of the surface as the pipeline 1 is laid.

The invention therefore provides for a method of laying lined pipeline which actively and successfully removes air pockets which might be trapped in the annulus between the liner and the host pipe. Furthermore, the liner is brought into closer contact and engagement with the host pipe. The removal of air in the annulus enables the pipeline test pressure to stabilise more quickly and avoids the risk of potential collapse during operational service life in the event the pipeline pressures fluctuate or a vacuum is created during an emergency shutdown.

The example described above relates to reel-lay installation but s-lay pipeline installation and j-lay pipeline installation will benefit equally from the invention. In these methods, a pipeline can be constructed length-by-length in which case adjacent sections of pipe are welded on board (as contrasted with a reel-lay method in which case a continuous length of pipe is deployed from a reel). Lined pipeline of indefinite length can be constructed without fear of an increased build up of air within discrete sections of the annulus that would occur with conventional approaches.

Furthermore, the invention permits lined pipeline to be installed while flooding rather than being installed and flooded after installation. Flooding after installation is not straightforward and the invention provides the same benefits (reduction in ovalisation, elimination of the need for anchoring means to secure an otherwise buoyant pipeline, etc.) with the additional benefit of having a tighter fitting liner with no air pockets within the annulus. Flexible flowlines are typically installed flooded so lined pipelines intended for use as flowlines can now be installed in the same way thanks to the invention.

In addition to "dry" installation as described above, it is envisaged that the pipeline could be filled with seawater at atmospheric pressure prior to laying on the seabed, rather than filled with air. The pressure of the water could be selected to reduce ovalisation. Flooding a pipeline from the seabed that is already filled with a lower pressure of water may reduce shock to the pipeline and/or liner when the end of the pipeline is opened. The pressure differential should still be sufficiently large to have the desired effect of expelling air from the annulus.

Note that rather than deploying a prefabricated lined pipeline from a reel, the lined pipeline can be constructed length-by-length using an s-lay barge or j-lay barge for example. In such an operation, a lined pipeline of any desirable length can be fabricated. Provided the lined pipe sections which are joined length by length are joined in such a manner as to preserve the continuity of the annulus between the host pipe and the pipe lining across the join, the inventive method will continue to permit venting of air trapped in the annulus as the pipe laying operation progresses. The invention therefore may also apply to tow-in methods.

It will also be noted that the pipeline need not be flooded from the seabed, provided the end of the lined pipeline is lowered towards the seabed to a depth at which a sufficient pressure differential is obtained before the end of the pipeline is opened to cause seawater to enter the pipeline under pressure. As before, the seawater rises to sea level inside the pipeline. The pipeline can then be lowered further, for example to the seabed. Again, as pipelay continues and the pipe settles on the seabed, there will be a resultant progressive radial expansion of the liner against the host pipe along the axis of the pipeline such that trapped air is continually driven along the annulus in the direction of the surface as pipelay continues. Similarly to the corresponding approach described above, it is also envisaged that in this arrangement the pipeline could be filled with seawater at atmospheric pressure before lowering towards the seabed.

The Applicant's earlier International Application Publication Number WO 2010/041016 discloses an electrofusion fitting and a method of forming a pipe joint between two lined metal pipe lengths incorporating such a fitting. Such a method can be employed to manufacture significant lengths of lined pipeline by joining together several lined metal pipe lengths using such electrofusion fittings either in a length-by-length manner on an s-lay or j-lay barge, or onshore in which case lined pipeline can be spooled onto a reel for installation by a reel lay vessel or alternatively towed to the installation location.

However, as noted above, any joining method which preserves the continuity of the annulus between the host pipe and the pipe lining across the join may be employed; the inventive method will continue to permit venting of air trapped in the annulus as the pipe laying operation progresses. For example, butt fusion welding may be employed to join sections of pipe lining.

Application of such methods results not only in a lined pipeline of significant length but the electrofusion fitting may be shaped and sized so as to maintain a continuous inner diameter along the entire length of the pipeline. The electrofusion fitting may also be shaped and sized so that there is a corresponding continuity provided along the outer diameter of the lining along the entire length of the pipeline and, accordingly, continuity of the annulus along the entire length of the pipeline. This allows the benefits of the invention disclosed herein to be realised with relative ease regardless of the mode of pipe laying selected.

As described herein, progressive flooding of a lined pipeline having a continuous annulus eliminates the risk of air building up and accumulating that would otherwise present a collapse risk to the liner in discrete sections of lined pipe that have been welded together using fittings containing barriers to the continuous annulus such as compression rings or welded fitments. The elimination of air accumulations in the liner lowers the risk of collapse during service life when operating pressures may be fluctuating; accordingly the installed pipeline has a higher level of integrity and reliability in service than previously possible.

Throughout the specification, unless the context demands otherwise, the terms 'comprise' or 'include', or variations such as 'comprises' or 'comprising', 'includes' or 'including' will be understood to imply the inclusion of a stated integer or group of integers, but not the exclusion of any other integer or group of integers.

The foregoing description of the invention has been presented for the purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims. For example, where pipe lining methods have been exemplified with reference to the Applicant's Swagelining® pipe lining service, it will be understood that the methods apply equally to pipelines lined using sliplining, folded liner insertion or other similar techniques.

The invention claimed is:

1. A method of laying lined pipeline on a seabed, the method comprising providing a lined pipeline having a continuous annulus between an internal polymer liner of the lined pipeline and a steel host pipe, lowering the lined pipeline towards the seabed while keeping a lower end of the pipeline closed, and subsequently opening the lower end of the pipeline while an upper end of the pipeline is open, to allow seawater to progressively flood the lined pipeline.

2. The method according to claim 1, wherein the lined pipeline is lowered to the seabed before opening the lower end of the pipeline to allow seawater to progressively flood the lined pipeline.

3. The method according to claim 1, wherein the lower end of the pipeline is opened when a effective pressure differential is obtained.

4. The method according to claim 1, comprising continuing to lay the pipeline while the lower end of the pipeline is open.

5. The method according to claim 1, wherein the lined pipeline is laid using a pipe lay vessel.

6. The method according to claim 5, wherein the pipe lay vessel is a reel lay vessel, and the lined pipeline is disposed on and deployed from a reel.

7. The method according to claim 5, wherein the pipe lay vessel is an s-lay or j-lay barge, and the lined pipeline is constructed length-by-length.

8. The method according to claim 5, wherein the pipe lay vessel tows the lined pipeline into position.

9. The method of claim 5, wherein the flooding of the lined pipeline is controlled from the pipe lay vessel.

10. The method of claim 1, wherein the lined pipeline comprises a plurality of lined pipe sections having respective linings that are joined to provide the continuous annulus between the linings and the pipes along the length of the joined pipe sections.

11. The method according to claim 10, wherein providing a lined pipeline comprises joining sections of lined pipe, and joining respective linings of the lined pipe sections to preserve the continuity of the annulus.

12. The method according to claim 10, wherein the respective linings are joined using one or more electrofusion fittings to preserve continuity of the annulus.

13. The method according to claim 12, further comprising testing the integrity of interfaces or welds between the electrofusion fitting or fittings and respective liners.

14. The method according to claim 10, wherein the respective linings are joined using one or more butt fusion welds to preserve continuity of the annulus.

15. The method of claim 12, wherein the electrofusion fitting or fittings comprise an inner diameter concentric with an inner diameter of respective liners.

16. The method of claim 12, wherein the electrofusion fitting or fittings comprise an outer diameter concentric with an outer diameter of the liner.

17. The method according to claim 13, wherein the integrity of an interface or weld is tested prior to laying the corresponding section of pipeline.

18. The method according to claim 1, comprising filling the lined pipeline with seawater at atmospheric pressure before lowering the lined pipeline towards the seabed.

* * * * *